(12) United States Patent
Fitzgerald et al.

(10) Patent No.: US 12,081,584 B2
(45) Date of Patent: Sep. 3, 2024

(54) METHODS AND APPARATUS TO DETERMINE MUTEX ENTROPY FOR MALWARE CLASSIFICATION

(71) Applicant: McAfee, LLC, San Jose, CA (US)

(72) Inventors: Niall Fitzgerald, Mahon (IE); German Lancioni, San Jose, CA (US); Brian Gaither, Plano, TX (US)

(73) Assignee: MCAFEE, LLC, San Jose, CA (US)

( * ) Notice: Subject to any disclaimer, the term of this patent is extended or adjusted under 35 U.S.C. 154(b) by 217 days.

(21) Appl. No.: 17/645,925

(22) Filed: Dec. 23, 2021

(65) Prior Publication Data

US 2023/0208872 A1   Jun. 29, 2023

(51) Int. Cl.
*H04L 9/40* (2022.01)
*G06F 21/56* (2013.01)
*G06F 40/20* (2020.01)
*G06F 40/279* (2020.01)

(52) U.S. Cl.
CPC ............ *H04L 63/145* (2013.01); *G06F 21/56* (2013.01); *G06F 40/20* (2020.01); *H04L 63/1416* (2013.01); *G06F 40/279* (2020.01)

(58) Field of Classification Search
CPC ...... G06F 21/566; G06F 21/56; G06F 21/567; G06F 40/20; G06F 40/216; G06F 40/274; G06F 40/263; G06F 40/279; G06F 40/284; G06F 40/289; H04L 63/145; H04L 63/1416
See application file for complete search history.

(56) References Cited

U.S. PATENT DOCUMENTS

| | | | | |
|---|---|---|---|---|
| 6,505,151 | B1* | 1/2003 | Chou | G06F 40/289 704/9 |
| 2015/0134326 | A1* | 5/2015 | Bell | G06F 40/237 704/9 |
| 2015/0172300 | A1* | 6/2015 | Cochenour | G06F 21/6218 726/23 |
| 2015/0319183 | A1* | 11/2015 | Liske | G06F 21/52 726/23 |
| 2016/0055248 | A1* | 2/2016 | Goel | G06F 16/134 707/770 |
| 2016/0352778 | A1* | 12/2016 | Chari | G06N 20/00 |
| 2019/0012456 | A1* | 1/2019 | Moore | G06N 20/00 |
| 2021/0097168 | A1* | 4/2021 | Patel | G06F 21/554 |

* cited by examiner

*Primary Examiner* — Benjamin E Lanier
*Assistant Examiner* — Brandon Binczak
(74) *Attorney, Agent, or Firm* — HANLEY, FLIGHT & ZIMMERMAN, LLC

(57) ABSTRACT

Methods, apparatus, systems, and articles of manufacture are disclosed to determine mutex entropy for malware classification. An example apparatus includes interface circuitry to access a mutex associated with a software application, the mutex to include a mutex identifier string, normalizer circuitry to normalize the mutex identifier string, character probability circuitry to determine character probabilities of characters within the normalized mutex identifier string, the character probabilities based on a historical mutex character distribution, entropy calculator circuitry to calculate an entropy value for the mutex based on the character probabilities, classifier circuitry to classify the mutex as clean or malicious based on the entropy value, and protector circuitry to mitigate malicious attacks based on the classification.

27 Claims, 13 Drawing Sheets

| ENTROPY | MUTEX STRING |
|---|---|
| 2.2119 | \SESSIONS\0\BASENAMEDOBJECTS\SM0:16904:64:WILERROR_02 |
| 0.8511 | \BASENAMEDOBJECTS\C:USERS?????\APPDATA\LOCAL\MICROSOFT\WINDOWS\EXPLORER\ICONCACHE_32.DB!DFMAINTAINER |
| 5.4343 | 583A945-62AF-10E8-4902-A8F205C72B2E |

FIG. 6

METHODS AND APPARATUS TO DETERMINE MUTEX ENTROPY FOR MALWARE CLASSIFICATION

FIELD OF THE DISCLOSURE

This disclosure relates generally to computer security and, more particularly, to methods and apparatus to determine mutex entropy for malware classification.

BACKGROUND

Malware is software that enables unauthorized access to networks for purposes of theft, sabotage, or espionage. In recent years, malware attacks have become increasingly diverse and complex. Computer security software companies are incentivized to produce malware identification software, which may be used by other businesses or general consumers to protect their systems and data.

BRIEF DESCRIPTION OF THE DRAWINGS

FIG. 6 is an illustrative example of the entropy calculator circuitry of FIG. 3.

In general, the same reference numbers will be used throughout the drawing(s) and accompanying written description to refer to the same or like parts. The figures are not to scale.

Figure 1:
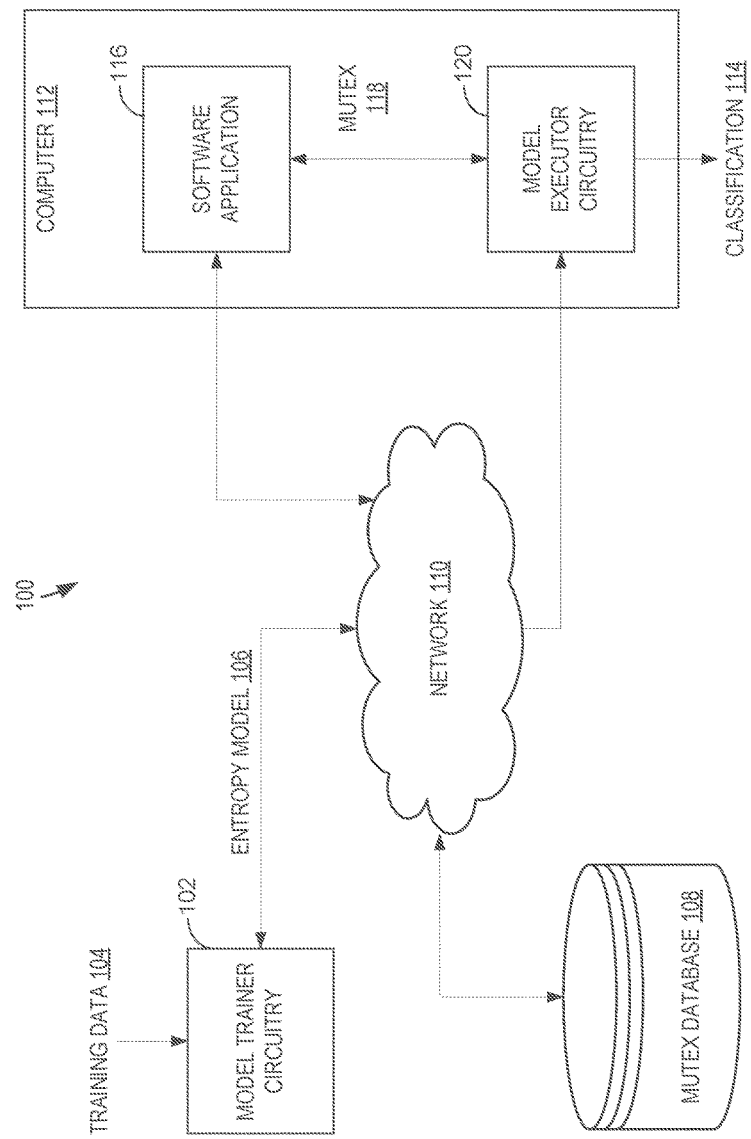
FIG. 1 is a block diagram of an example system to determine mutex entropy for malware classification.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/− 1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operations) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Traditionally, many threats to computer security relied upon file based malware attacks. In a file based malware attack, individuals with malicious intent hide malware within a file and employ various techniques to save the file onto a target machine. Once the file is on the target machine, individuals may activate the malware to access the computational resources of the target machine, deploy an attack, and generally violate computer security.

In recent years, improvements to network quality and file sharing systems have reduced the dependence to save files onto a local machine. Security solutions against file based malware attacks have also improved in recent years. As a result, the number of file-less malware attacks have increased. In a file-less malware attack, individuals with malicious intent may hide malware within files generated by an operating system rather than a file can be accessed by a user and saved within a directory. In some examples, files generated by an operating system may be referrer to as operating system binaries.

One element of how operating binaries may hide malware is by use of mutexes. A mutex is a data structure that mutually excludes multiple threads from accessing a shared computational resource. A mutex may be assigned to one thread at a time. When the mutex is assigned to a given thread, the assigned thread may access the shared computational resource and other threads are unable to do so. The operating system may manage the mutex by determining how long a thread is assigned the mutex and determining the order of which multiple threads will be assigned the mutex. Additionally or alternatively, a mutex may be used to mutually exclude multiple processes from accessing a shared computational resource.

A mutex data structure may support a malware attack by hiding content within string data structures. In some examples, the hidden content within a muter string may be necessary for the malware to execute. Additionally or alternatively, the hidden content may be used to determine whether certain firms of malware already exist on a given machine. The hidden content within a mutex string may be stored in various formats. Examples of formats that may be used to hide content in a mutex string include but are not limited to IP addresses, URLs, code snippets, and executable locations.

Artificial intelligence (AI), including machine learning (ML), deep learning (DL), and % or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in outputs) consistent with the recognized patterns and/or associations.

Examples approaches disclosed herein determine mutex entropy for malty are classification using an example entropy model. To construct a model, example mutex identifier circuitry identities a labeled mutex within training data. Example normalizer circuitry normalizes a mutex identifier string associated with the mutex. Example character distribution circuitry creates or updates the historical mutex character distribution using the labeled mutex. Example entropy calculator circuitry determines an entropy value for the labeled mutex based on the historical mutex character distribution. The entropy value is used as an input, along with additional information from the training data, to train an example entropy model.

To execute the example entropy model, interface circuitry receives a mutex associated with a software application. Example character probability circuitry determines character probabilities of an associated mutex identifier string using the historical mutex character distribution. The character probabilities are used by example entropy calculator circuitry to determine an entropy value for the mutex. The entropy value and the example entropy model are used as inputs to example classifier circuitry, which classifies the mutex as clean or malicious. Example protector circuitry may take additional steps to mitigate malicious activities based on the classification of the mutex. Through model training and model execution, the example mutex entropy values described herein may be used to mitigate malicious activity and maintain computer security.

FIG. 1 is a block diagram of an example system 100 to determine mutex entropy for malware classification. The example system 100 includes example model trainer circuitry 102, training data 104, an example entropy model 106, an example mutex database 108, an example network 110, an example computer 112, and a classification 114. The example computer includes a software application 116, a mutex 118, and example model executor circuitry 120.

The example model trainer circuitry 102 of FIG. 1 is used to train the example entropy model 106 to operate in accordance with patterns and/or associations based on, for example, training data 104. The example entropy model 106 includes internal parameters that guide how input data is transformed into output data, such as through a series of nodes and connections within the model to transform input data into output data. Additionally, hyperparameters may be used as part of the training process to control how the teaming is performed (e.g., a learning rate, a number of layers to be used in the machine learning model, etc.). Hyperparameters are defined to be training parameters that are determined prior to initiating the training process.

Many different types of machine learning models and/or machine learning architectures exist, in examples described herein, the example model trainer circuitry 102 uses a deep learning model. A deep learning model enables the example model trainer circuitry 102 to consider multiple inputs, including but not limited to mutexes, when training or improving the example entropy model 106. In other examples, the example model trainer circuitry 102 may use other types of machine learning models such as a rules based heuristic algorithm.

Different types of training may be performed based on the ML/AI architecture and/or the expected output of the example entropy model 106. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) invokes inferring patterns from inputs to select parameters for the ML/AI model (e.g., without the benefit of expected (e.g., labeled) outputs).

In general, the machine learning models, architectures, and/or types are implemented in a training algorithm. In the example entropy model 106, the training algorithm may be stochastic gradient descent. However, any other training algorithm may additionally or alternatively be used In examples disclosed herein, the example model trainer circuitry 102 implements the training algorithm until the error rate in mutex classification satisfies a threshold In FIG. 1, the example model trainer circuitry 102 is illustrated on a separate machine from the example model executor circuitry 120. The separate machine may be hosted remotely at a central facility. In some examples, the example model trainer circuitry 102 may be implemented on the same machine as the example model executor circuitry 120. In some such examples, the machine may be an edge device.

The example model trainer circuitry 102 may implement the training algorithm using hyperparameters that control how the learning is performed (e.g., a learning rate, a number of layers to be used in the machine learning model, etc.). In some examples re-training may be performed. Such re-training may be performed in response to a change in the classification error rate of unknown mutexes.

The example model trainer circuitry 102 implements the training algorithm using training data 104. In examples disclosed herein, the training data 104 may be publicly available or may be locally generated. Because supervised training is used, the training data 104 is labeled. Labeling may be applied to the training data 104 manually. Additionally or alternatively, labeling may be applied using historical data from an example computer security company utilizing example entropy values for mutex classification as described herein. In examples disclosed herein, the training data 104 is sub-divided into labeled mutexes and muter metadata. Mutex metadata refers to any information that further describes the mutex and its environment. Examples of muter metadata include but are not limited to the name of the software application associated with the muter, timestamps of when the mutex was used, a list of threads that have access to the mutex, etc. The example model trainer circuitry 102 is explored further in FIG. 2.

The example network 110 of FIG. 1 connects and facilitates communication between the example model trainer circuitry 102, the example mutex database 108, and the example model executor circuitry 120. The example network 110 may also be used by the software application 116 to perform a task. In this example, the example network 110 is the Internet. However, the example network 110 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example mutex database 108 of FIG. 1 stores one or more versions of the example entropy model 106. The example mutex database 108 may store additional information used to form the example entropy model 106. Additional information used to form the example entropy model 106 is explored further in FIG. 2.

The example mutex database 108 is implemented by any memory, storage device and/or storage disc for storing data such as, for example, flash memory, magnetic media, optical media, solid state memory, hard drive(s), thumb drive(s), etc. Furthermore, the data stored in the example mutex database 108 may be in any data format such as, for example, binary data comma delimited data, tab delimited data, structured query language (SQL) structures, etc. While, in the illustrated example, the example mutex database 108 is illustrated as a single device, the example mutex database 108 and/or any other data storage devices described herein may be implemented by any number and/or type(s) of memories.

The example computer 112 of FIG. 1 includes the software application 116 and the example model executor circuitry 120. While not illustrated in FIG. 1, the example computer 112 contains additional computational resources. For example, the example computer 112 contains an operating system. An operating system is system software that manages computer hardware, software resources, and provides common services for computer programs. Additionally, the example computer 112 may be implemented by the example processing platform of FIG. 10. FIG. 1 illustrates one instance of the example computer 112 for simplicity. The example system 100, however, may include any number of example computer 112 instances.

The software application 116 of FIG. 1 performs one or more tasks. The one or more tasks may be of any type In some examples, the software application 116 accesses the example network 110 to perform the one or more tasks. To perform the one or more tasks, the software application 116 triggers the operating system in the example computer 112 to generate the mutex 118. In some examples, the software application 116 triggers the generation of multiple mutexes.

The example model executor circuitry 120 accesses the example entropy model 106 from the example mutex database 108 via the example network 110. The model executor circuitry operates the example entropy model in an inference phase to process data In the inference phase, the mutex 118 (e.g., live data) is input to the example entropy model 106, and the example entropy model 106 executes to output data. The output data of the example model executor circuitry 120 is the classification 114, which is associated with the mutex 118 and describes whether the mutex 118 is clean or malicious. This inference phase can be thought of as the AI "thinking" to generate the output based on what it learned from the training (e.g., by executing the model to apply the learned patterns and/or associations to the live data). In some examples, input data undergoes pre-processing before being used as an input to the example entropy model 106. Moreover, in some examples, the output data may undergo post-processing after it is generated by the example entropy model 106 to mitigate malicious activities.

In some examples, output of the deployed model may be captured and provided as feedback to the example model trainer circuitry 102 via the network. By analyzing the feedback, an accuracy of the example entropy model 106 can be determined. If the feedback indicates that the accuracy of the example entropy model 106 fails to satisfy a threshold or other criterion, training of an updated model can be triggered using the feedback and an updated training data set, hyperparameters, etc., to generate an updated, deployed model.

The example system 100 of FIG. 1 produces an example entropy model 106 that is used to classify the mutex 118 as clean or malicious. The mutex classification may then be used to mitigate malicious activity. Mitigated malicious activity include but are not limited to file-less malware attacks.

Figure 2:
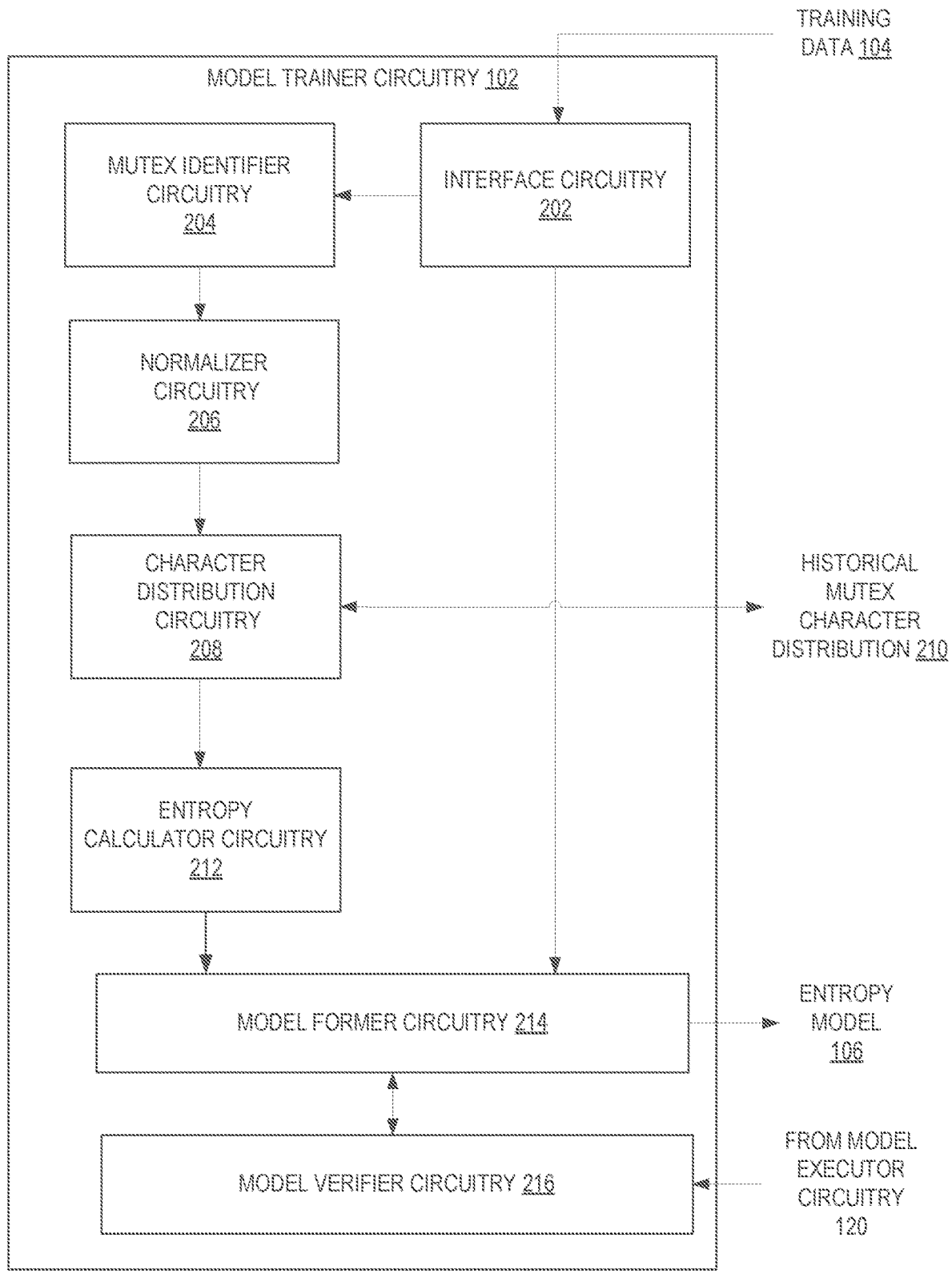
FIG. 2 is a block diagram of an example implementation of the model trainer circuitry of FIG. 1.

FIG. 2 is a block diagram of example model executor circuitry 120 to train the example entropy model 106. The example model executor circuitry 120 of FIG. 2 may be instantiated (e.g., creating an instance of, bring into being for any length of time, materialize, implement, etc.) by processor circuitry such as a central processing unit executing instructions. Additionally or alternatively, the example model executor circuitry 120 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor. The example model trainer circuitry 102 includes example interface circuitry 202, example mutex identifier circuitry 204, example normalizer circuitry 206, example character distribution circuitry 208, a historical mutex character distribution 210, example entropy calculator circuitry 212, and example model former circuitry 214.

The example interface circuitry 202 of FIG. 2 accesses training data 104. The training data 104 may be provided by an example computer security software company that seeks to integrate mutex classification into a malware identification software application. In some examples, the example interface circuitry 202 may access the training data 104 over the example network 110. The training data 104 includes labeled mutexes and mutex metadata as described previously.

The example mutex identifier circuitry 204 identifies and accesses the labeled mutexes from the example interface circuitry 202. While some or all of the mutex metadata may be used directly as inputs to the training algorithm, the example mutex identifier circuitry 204 accesses labeled mutexes for creation of mutex entropy values. The example mutex identifier circuitry 204 provides the labeled mutexes to the example character distribution circuitry.

The example normalizer circuitry 206 of FIG. 2 normalizes mutex identifier strings. A mutex identifier string is a data type stored within the data structure of a mutex and may be used to identify said mutex. A mutex identifier string is composed of one or more characters in a specific sequence. Furthermore, a character may be associated with one or more diacritics. A diacritic is a symbol that adds meaning to a character. Example diacritics that may be associated with a character include but are not limited to accents, cedillas, tildes, umlauts, etc.

A given character and diacritic combination may have multiple ways to be represented together. In some examples, a character and diacritic representation may be referred to as an encoding. To normalize the mutex identifier string, the example normalizer circuitry 206 may map multiple instances of a character and diacritic combination to a single character representation. In some examples, the single character representation is listed in the Unicode® standard for character encodings. Mapping multiple instances of a character and diacritic combination to a single character representation prevents the example character distribution circuitry 208 from evaluating the multiple instances as different characters. In doing so, the example normalizer circuitry 206 helps to maintain or improve the accuracy of the final entropy value.

The example normalizer circuitry 206 may additionally or alternatively remove non-differentiable characters to normalize a mutex identifier string. A non-differentiable character is a character that is commonly used across various programming languages and is therefore not useful in determining whether the mutex is clean or malicious. The example normalizer circuitry 206 may determine which characters are non-differentiable using a pre-determined rule-set. The pre-determined rule-set may be generated by the example computer security software company using empirical evidence.

The example character distribution circuitry 208 determines or updates a historical mutex character distribution 210 using the labeled mutexes. The historical mutex character distribution 210 describes the frequency of characters within a historical data set of mutex identifier strings. In some examples, the frequency of a character within the historical data set of mutex identifier strings may be referred to as a character probability. The historical data set of mutex identifier strings may be provided by the example computer security software company. In some such examples, some or all of the historical data set of mutex identifier strings may be considered part of the training data 104. Additionally or alternatively, the historical data set of mutex identifier strings may be updated or edited following feedback from example model executor circuitry 120. The historical mutex character distribution 210 and the historical data set of mutex identifier strings are stored in the example mutex database 108 and accessed by the example character distribution circuitry 208 via the example network 110. The historical mutex character distribution 210) is explored further in FIG. 5.

The example entropy calculator circuitry 212 calculates an example entropy value for each of the labeled mutexes using the historical mutex character distribution 210. The entropy value of a given mutex is described by the entropy equation.

$$H = -\sum_{c=0}^{n_c} p_c \frac{\ln(p_c)}{\ln(2)}$$

In the entropy equation, H refers to the entropy value, c refers to an index that starts at 0, and $n_c$ refers to the total number of characters in the associated mutex identifier string. Further, $p_c$ refers to the character probability of a character at position c within the mutex identifier string. For each character in the mutex identifier string, $$\sum_{c=0}^{n_c},$$

the example entropy calculator circuit 212 calculates a natural log of a character probability associated with the character, ln ($p_c$), a quotient determined by the natural log of the character probability divided by the natural log of two, $$\frac{\ln(p_c)}{\ln(2)},$$

and a product determined by the quotient multiplied with the character probability, $$p_c \frac{\ln(p_c)}{\ln(2)}.$$

The entropy calculator circuitry 212 calculates the entropy value H through a negative summation of the products, $$H = -\sum_{c=0}^{n_c}\left(p_c \frac{\ln(p_c)}{\ln(2)}\right).$$

In some examples, the example entropy calculator circuitry 212 may implement a system to calculate the entropy equation in which indices start at 1 rather than 0. In some such examples, the index variable c starts the negative summation with a value of 1 rather than 0. The example entropy calculator circuitry 212 is explored further in FIGS. 4 and 6.

The example model former circuitry 214 of FIG. 2 accesses entropy values from the example entropy calculator circuitry 212 and mutex metadata from the example interface circuitry 202. The example model former circuitry 214 uses the entropy values and some or all of the mutex metadata to implement a training algorithm as described previously. The output of the training algorithm is the example entropy model 106.

The example model verifier circuitry 216 of FIG. 2 determines the classification error rate of the example entropy model 106 provided by the example model former circuitry 214. In some examples, the example model verifier circuitry 216 may use additional training data provided by the example computer security software company to determine the classification error rate. In other examples, the example entropy model 106 is deployed for live usage and the example model verifier circuitry 216 accesses feedback from the example model executor circuitry 120 to determine the classification error rate. The example model verifier circuitry 216 uses the classification error rate to determine whether to re-train the example entropy model 106. In some examples, the example model verifier circuitry 216 may additionally or alternatively train a new version of the example entropy model 106.

The example model trainer circuitry 102 of FIG. 2 includes circuitry to access training data 104, calculate entropy values, and form the example entropy model 106 based in part on the entropy values. The example entropy model 106 may then be used by the example model executor circuitry 120 to classify mutexes as clean or malicious and mitigate malicious activity.

Figure 3:
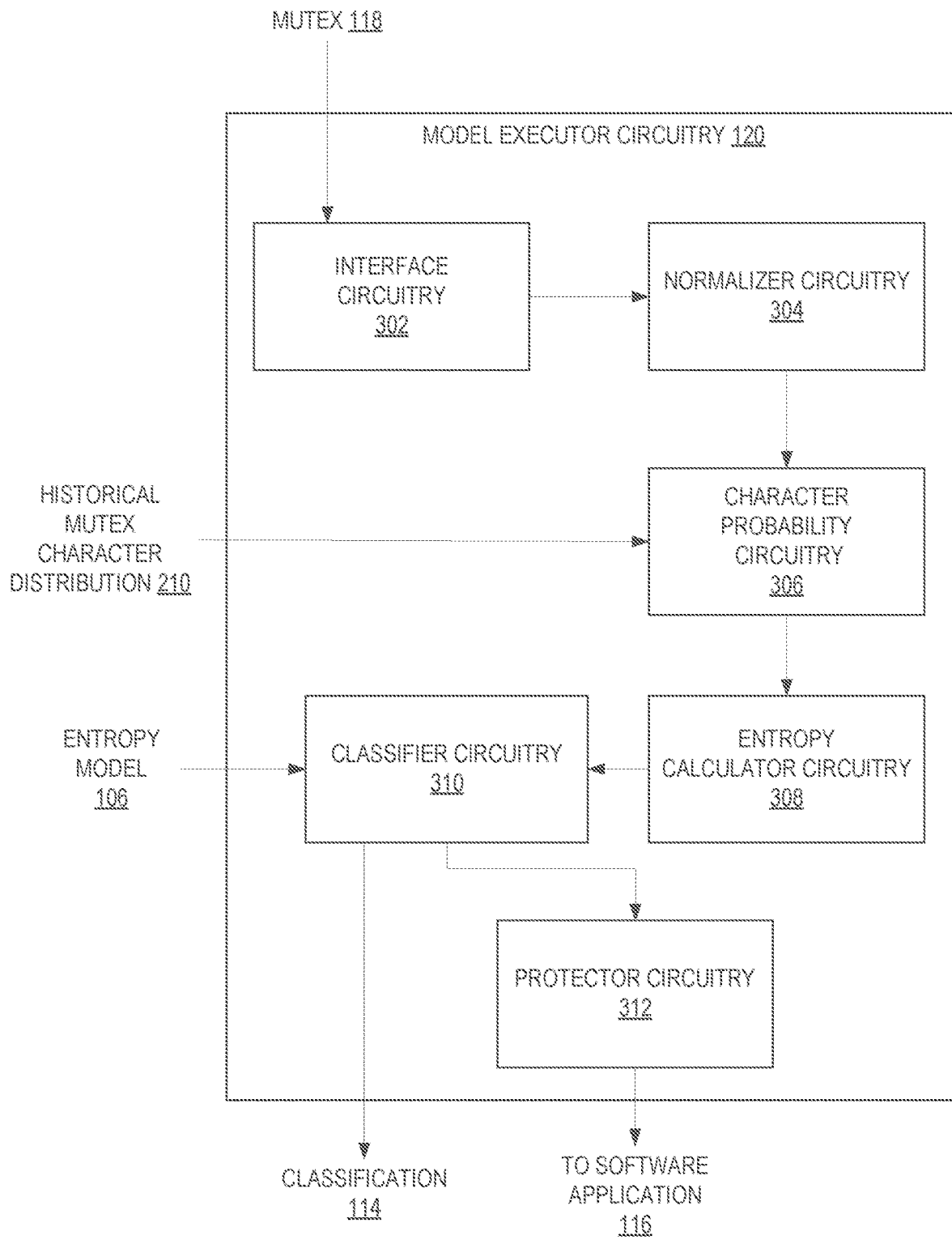
FIG. 3 is a block diagram of an example implementation of the model executor circuitry of FIG. 1.

FIG. 3 is a block diagram of example model executor circuitry 120 to execute the example entropy model 106. The example model executor circuitry 120 of FIG. 3 may be instantiated (e.g., creating an instance of, bring into being for any length of time, materialize, implement, etc.) by processor circuitry such as a central processing unit executing instructions. Additionally or alternatively, the example model executor circuitry 120 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor. The example model executor circuitry 120 of FIG. 3 includes interface circuitry 302, example normalizer circuitry 304, example character probability circuitry 306, example entropy calculator circuitry 308, example classifier circuitry 310, and example protector circuitry 312.

The interface circuitry 302 of FIG. 3 accesses the mutex 118 associated with the software application 116. In some examples, the interface circuitry 302 may access multiple mutexes. In some such examples, the multiple mutexes may be associated with one or more software applications. The interface circuitry 302 provides the mutex to the example normalizer circuitry 304.

In some examples, the example model executor circuitry 120 includes means for accessing a mutex associated with a software application. For example, the means for accessing may be implemented by interface circuitry 302. In some examples, the interface circuitry 302 may be instantiated by processor circuitry such as the example processor circuitry 1012 of FIG. 10. For instance, the interface circuitry 302 may be instantiated by the example general purpose processor circuitry 1100 of FIG. 11 executing machine executable instructions such as that implemented by at least blocks 802 of FIG. 8. In some examples, the interface circuitry 302 may be instantiated by hardware logic circuitry, which may be implemented by an ASIC or the FPGA circuitry 1200 of FIG. 12 structured to perform operations corresponding to the machine readable instructions. Additionally or alternatively, the interface circuitry 302 may be instantiated by any other combination of hardware, software, and/or firmware. For example, the interface circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example normalizer circuitry 304 normalizes the mutex identifier string associated with the mutex. The example normalizer circuitry 304 maps multiple instances of a character and diacritic combination to a single character representation using the same technique as described in the example normalizer circuitry 206 of FIG. 2. Similarly, the example normalizer circuitry 304 removes un-differentiating characters using the same technique as described in the example normalizer circuitry 206 of FIG. 2. In examples where the example model trainer circuitry 102 and the example model executor circuitry 120 are in the same machine, the example normalizer circuitry 304 and the example normalizer circuitry 206 may be implemented by the same hardware components.

In some examples, the example model executor circuitry 120 includes means for normalizing a mutex string. For example, the means for normalizing may be implemented by example normalizer circuitry 304. In some examples, the example normalizer circuitry 304 may be instantiated by processor circuitry such as the example processor circuitry 1012 of FIG. 10. For instance, the example normalizer circuitry 304 may be instantiated by the example general purpose processor circuitry 1100 of FIG. 11 executing machine executable instructions such as that implemented by at least blocks 804 of FIG. 8. In some examples, the example normalizer circuitry 304 may be instantiated by hardware logic circuitry, which may be implemented by an ASIC or the FPGA circuitry 1200 of FIG. 12 structured to perform operations corresponding to the machine readable instructions. Additionally or alternatively, the example normalizer circuitry 304 may be instantiated by any other combination of hardware, software, and/or firmware. For example, the example normalizer circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for normalizing includes means for means for mapping multiple instances of a character and diacritic combination to a single character representation; and means for removing non-differentiable characters.

The example character probability circuitry 306 determines one or more character probabilities of the normalized mutex identifier string. For each unique character in the mutex identifier string, the example character probability circuitry 306 finds the character probability of the unique character in the historical mutex character distribution 210. The example character probability circuitry 306 records the character probabilities of the characters found in the mutex string in a data structure. In some examples, the data structure is a dictionary. In other examples, alternative data structures may be used.

The data structure provided by the example character probability circuitry 306, which holds probabilities specific to the characters in a single mutex identifier string, is smaller or equal in size to the historical mutex character distribution 210, which holds probabilities of every normalized character representation found in the historical data set of mutex identifier strings. In many examples, the data structure may be significantly smaller in size than the historical mutex character distribution 210. As a result, the example entropy calculator circuitry 308 may use the data structure to efficiently search for a given character probability.

In some examples, the example model executor circuitry 120 include means for determining character probabilities of characters within the normalized mutex identifier string. For example, the means for determining may be implemented by example character probability circuitry 306. In some examples, the example character probability circuitry 306 may be instantiated by processor circuitry such as the example processor circuitry 1012 of FIG. 10. For instance, the example character probability circuitry 306 may be instantiated by the example general purpose processor circuitry 1100 of FIG. 11 executing machine executable instructions such as that implemented by at least blocks 806 of FIG. 8. In some examples, the example character probability circuitry 306 may be instantiated by hardware logic circuitry, which may be implemented by an ASIC or the FPGA circuitry 1200 of FIG. 12 structured to perform operations corresponding to the machine readable instructions. Additionally or alternatively, the example character probability circuitry 306 may be instantiated by any other combination of hardware, software, and/or firmware. For example, the example character probability circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example entropy calculator circuitry 308 of FIG. 3 calculates an entropy value for the mutex. The example entropy calculator circuitry 308 calculates the entropy value using the entropy equation as described in FIG. 2. In examples where the example model trainer circuitry 102 and the example model executor circuitry 120 are in the same machine, the example entropy calculator circuitry 308 and the example entropy calculator circuitry 212 may be implemented by the same hardware components.

In some examples, the example model executor circuitry 120 includes means for calculating an entropy value for the mutex based on character probabilities. For example, the means for determining may be implemented by example entropy calculator circuitry 308. In some examples, the example entropy calculator circuitry 308 may be instantiated by processor circuitry such as the example processor circuitry 1012 of FIG. 10. For instance, the example entropy calculator circuitry 308 may be instantiated by the example general purpose processor circuitry 1100 of FIG. 11 executing machine executable instructions such as that implemented by at least blocks 808 of FIG. 8. In some examples, the example entropy calculator circuitry 308 may be instantiated by hardware logic circuitry, which may be implemented by an ASIC or the FPGA circuitry 1200 of FIG. 12 structured to perform operations corresponding to the machine readable instructions. Additionally or alternatively, the example entropy calculator circuitry 308 may be instantiated by any other combination of hardware, software, and/or firmware. For example, the example entropy calculator circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for calculating an entropy value includes means for calculating a natural log of a character probability from the multiple character probabilities, a quotient determined by the natural log of the character probability divided by the natural log of two, a product determined by the quotient multiplied with the character probability, and a negative summation of the first product and the multiple products.

The example classifier circuitry 310 of FIG. 3 accesses the entropy value from the example entropy calculator circuitry 308 and the example entropy model 106 from the example mutex database 108 via the example network 110. The example classifier circuitry 310 implements the example entropy model 106 using inputs that include, but are not limited to, the entropy value. The output of the example entropy model 106 is the classification 114, which describes whether the muter 118 is clean or malicious.

In some examples, the example model executor circuitry 120 includes means for classifying a mutex as clean or malicious based on the entropy value. For example, the means for classifying may be implemented by example classifier circuitry 310. In some examples, the example classifier circuitry 310 may be instantiated by processor circuitry such as the example processor circuitry 1012 of FIG. 10. For instance, the example classifier circuitry 310 may be instantiated by the example general purpose processor circuitry 1100 of FIG. 11 executing machine executable instructions such as that implemented by at least blocks 810 of FIG. 8. In some examples, the example classifier circuitry 310 may be instantiated by hardware logic circuitry, which may be implemented by an ASIC or the FPGA circuitry 1200 of FIG. 12 structured to perform operations corresponding to the machine readable instructions. Additionally or alternatively, the example classifier circuitry 310 may be instantiated by any other combination of hardware, software, and/or firmware. For example, the example classifier circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining includes means for executing a model, the model trained using a deep learning architecture or a rules based heuristic algorithm, the model to accept the entropy value as an input.

The example protector circuitry 312 mitigates malicious activity based on the classification 114. The specific actions taken to mitigate malicious may depend on several factors. Factors considered when the example protector circuitry 312 may include but are not limited to the software application 116, other information stored in the mutex data structure, the computational resources available to the example model executor circuitry 120, a rule set pre-determined by the example computer security software, etc. The example protector circuitry 312 is explored further in FIG. 9.

In some examples, the example model executor circuitry 120 includes means for mitigating malicious activity based on a classification. For example, the means for mitigating may be implemented by example protector circuitry 312. In some examples, the example protector circuitry 312 may be instantiated by processor circuitry such as the example processor circuitry 1012 of FIG. 10. For instance, the example protector circuitry 312 may be instantiated by the example general purpose processor circuitry 1100 of FIG. 11 executing machine executable instructions such as that implemented by at least blocks 814 of FIG. 8. In some examples, the example protector circuitry 312 may be instantiated by hardware logic circuitry, which may be implemented by an ASIC or the FPGA circuitry 1200 of FIG. 12 structured to perform operations corresponding to the machine readable instructions. Additionally or alternatively, the example protector circuitry 312 may be instantiated by any other combination of hardware, software, and/or firmware. For example, the example protector circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining includes means for setting a caution flag, means for blocking the computational resources of a software application, and means for identifying additional mutexes associated with the software application The example model executor circuitry 120 of FIG. 3 calculates an entropy value and uses it as an input to the example entropy model 106. The example entropy model 106 produces a classification 114 which may be used to mitigate malicious activity and improve computer security.

Figure 4:
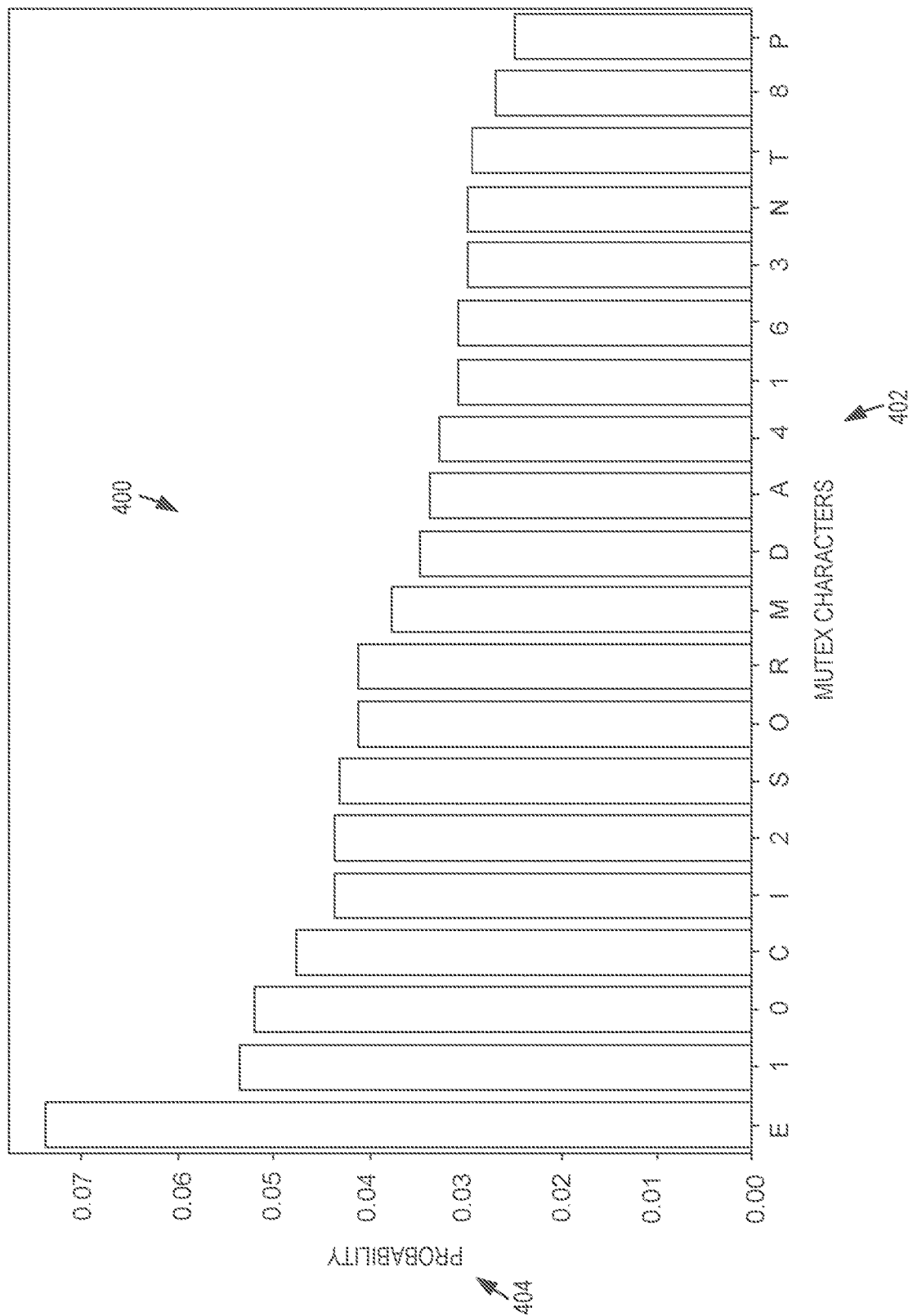
FIG. 4 is an illustrative example of the historical mutex character distribution of FIG. 2.

FIG. 4 is an illustrative example of the historical mutex character distribution 210) of FIG. 2. In FIG. 4, the historical mutex character distribution 210 is illustrated to include an x axis 402 and a y axis 404. The x axis 402 of FIG. 4 lists each normalized character representation found in the historical data set of mutex identifier strings stored in the example mutex database 108. The x axis 402 may include any number of characters. FIG. 4 illustrates the x axis 402 with twenty characters for simplicity. In practice, the set of normalized character representations in the historical data set may span across multiple natural languages, multiple programming languages, and millions of mutex identifier strings. As a result, the x axis 402 may also contain millions of normalized character representations.

The y axis 404 of FIG. 4 describes character probability. For any given normalized character representation described on the x axis 402, the character probability listed on they axis 404 is the probability that a randomly selected character within a randomly selected mutex identifier string in the historical data set is the given normalized character representation. The character probability of a normalized character representation may be calculated by dividing the total number of times the normalized character representation is found in the historical data set by the total number of all normalized character representations in the historical data set.

The historical mutex character distribution 210 presents the character probabilities of all characters within a historical data set of mutex identifier strings. As a result, the entropy value of a given mutex identifier string is calculated independently of the natural language and the programming language in which the mutex identifier string was written. In some examples, this independence may be referred to as locale independence.

Using the historical mutex character distribution 210, the example computer security company may determine a relationship between that character probabilities of malicious mutex identifier strings and the character probabilities of clean mutex identifier strings. The example computer security company may use this relationship to develop the example entropy calculator circuitry 212 and produce entropy values that help classify an unknown mutex as clean or malicious.

Figure 5:
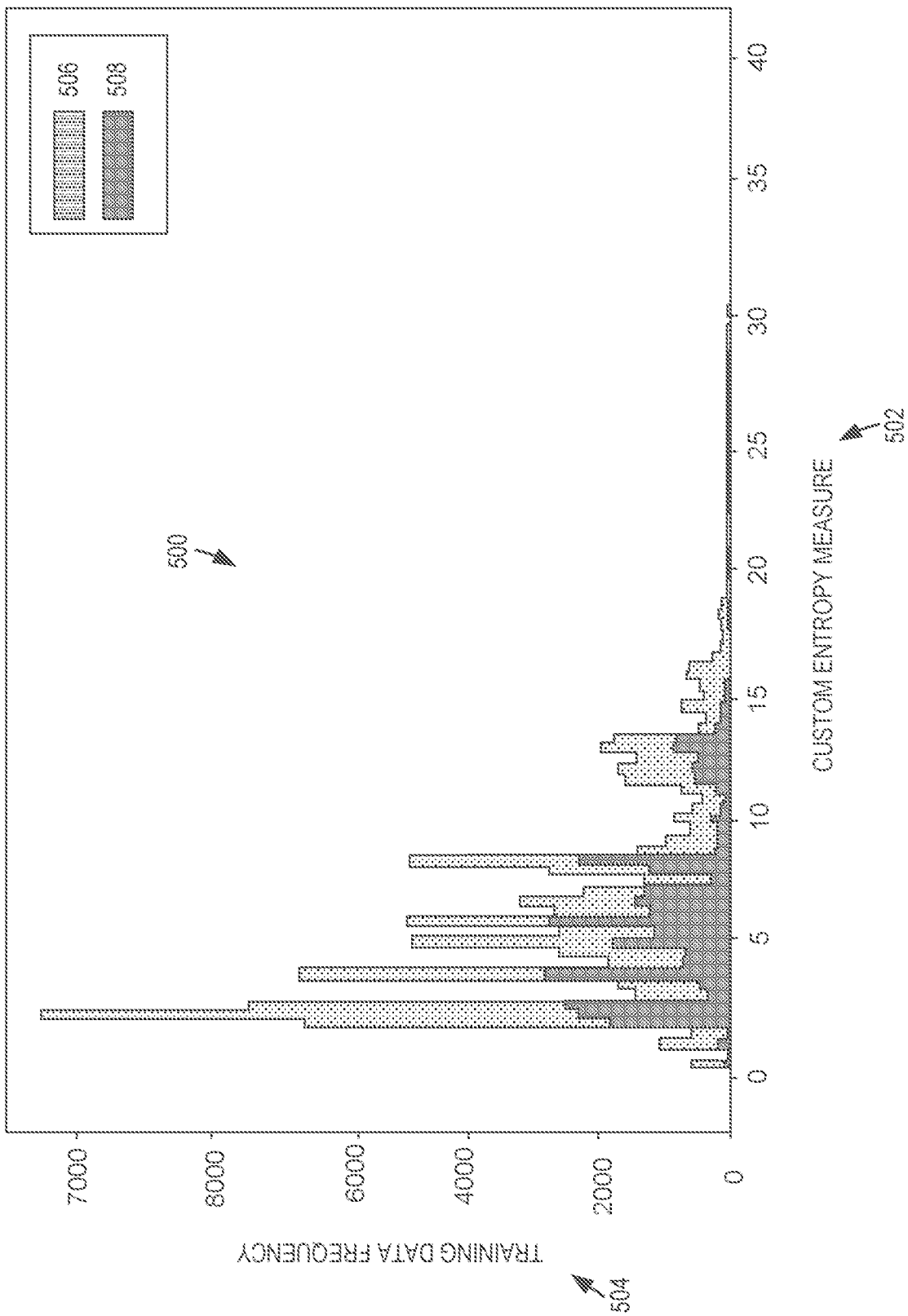
FIG. 5 is an illustrative example of the entropy calculator circuitry of FIG. 2.

FIG. 5 is an illustrative example of the entropy calculator circuitry of FIG. 2. FIG. 5 illustrates a graph 500. The graph 500 includes a x axis 502, a y axis 504, an example first histogram 506, and an example second histogram 508.

The x axis 502 of FIG. 5 represents possible entropy values that a mutex may have. The x axis 502 begins at 0 because entropy values as defined by the entropy equation of FIG. 2 are positive. Furthermore, while FIG. 5 labels entropy values from 0 to 40 in increments of 5, the x axis 502 may be subdivided into any number of increments because entry values as defined by the entropy equation of FIG. 2 may have decimals.

The y axis 504 of FIG. 5 represents the mutex frequency. The mutex frequency describes the number of mutexes from a set of example training data that are equal to a given entropy value or between two similar entropy values.

The example first histogram 506 describes the entropy values of the mutexes labeled clean in the example training data. Similarly, the example second histogram 508 describes the number of mutexes labeled malicious in an example data set. Additionally or alternatively, the mutexes described by the example first histogram 506 may be labeled as not dirty, and the mutexes described by the example second histogram 508 may be labeled as dirty. In some examples, the example data set is some or all of the historical data set of mutex identifier strings stored in the example mutex database 108.

The graph 500 of FIG. 5 allows for comparison between the entropy values of clean and malicious mutexes. For example, data from the first example histogram may be used to calculate an average entropy value for all clean mutexes within the example training data set. Furthermore, data from the example second histogram 508 may be used to calculate an average entropy value for all malicious mutexes within the example training data set. The graph 500 illustrates that within the example data set, the average entropy value of malicious mutexes is treater than the average entropy value of clean mutexes.

The example model former circuitry 214 may use comparison of labeled mutex averages, and/or make similar comparisons from the graph 500, to accurately form an example entropy model 106 based on the example training data set. For example, if the example model former circuitry 214 implements a training algorithm based on a deep learning algorithm, information determined by comparisons from the graph 500 may be used to determine the weights of one or more nodes within a neural network. By determining the weights based on comparisons from the graph 500, the example model firmer circuitry 214 may set or adjust the impact that an entropy value has on the classification of the associated mutex.

FIG. 6 is an illustrative example of the entropy calculator circuitry of FIG. 3. FIG. 6 includes a first mutex string 602, a first entropy value 604, second mutex string 606, a second entropy value 608, a third mutex string 610, and a third entropy value 612.

The first mutes, string 602 and the second mutex string 606 are examples of clean mutexes that are generated by an operating system and do not contain malware. The first mutex string 602 and the second mutex string 606 may refer to the locations of shared memory objects. When threads are assigned the mutex associated with the first mutex string, they may have mutually exclusive access to the shared memory object described by the first mutex string. As described in FIG. 5, the example character distribution circuitry 208 and example entropy calculator circuitry 212 may produce lower average entropy values for clean mutexes. As a result, the first entropy value 604 is less than 2.5 and the second entropy value 608 is less than 1.

The third mutex string 610 is an example of a malicious mutex that may have been utilized in the 2020 SUNBURST attack. The 2020 SUNBURST attack refers to a malware program that gained access to federal government systems and contributed to a national data breach. Malicious mutexes may include content such as but not limited to a hash value or a unique alphanumeric identifier to obfuscate the use of the mutex to identify malware programs and/or support malware attacks. This obfuscation may result in a higher entropy value for malicious mutex strings than clean mutex strings that describe a shared memory object or have other clean use cases. For example, the characters in the third mutex string 610 have different character probabilities than the first mutex string 602 and the second mutex string 606. As a result, the third entropy value 612 has a value over 5.

The example classifier circuitry 310 uses the entropy values determined by the example entropy calculator circuitry 308 as inputs to the example entropy model 106. The example entropy model 106 may identify the third mutex string 610 as malicious and trigger the example protector circuitry 312 to mitigate malicious activity such as a data breach.

While an example manner of implementing the example model trainer circuitry of FIG. 1 is illustrated in FIG. 2, one or more of the elements, processes, and/or devices illustrated in FIG. 2 may be combined, divided, re-arranged, omitted, eliminated, and/or implemented in any other way. Further, the interface circuitry 302, the example mutex identifier circuitry 204, example normalizer circuitry 304, example character distribution circuitry 208, example entropy calculator circuitry 308, example model former circuitry 214 and/or, more generally, the example model trainer circuitry 102 of FIG. 1, may be implemented by hardware alone or by hardware in combination with software and/or firmware. Thus, for example, any of the interface circuitry 302, the example mutex identifier circuitry 204, example normalizer circuitry 304, example character distribution circuitry 208, example entropy calculator circuitry 308, example model former circuitry 214 and/or, more generally, the example model trainer circuitry 102 of FIG. 1, could be implemented by processor circuitry, analog circuit(s), digital circuit(s), logic circuit(s), programmable processor(s), programmable microcontroller(s), graphics processing units) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example model trainer circuitry 102 of FIG. 1 may include one or more elements, processes, and/or devices in addition to, or instead of, those illustrated in FIG. 2, and/or may include more than one of any or all of the illustrated elements, processes and devices.

Figure 7:
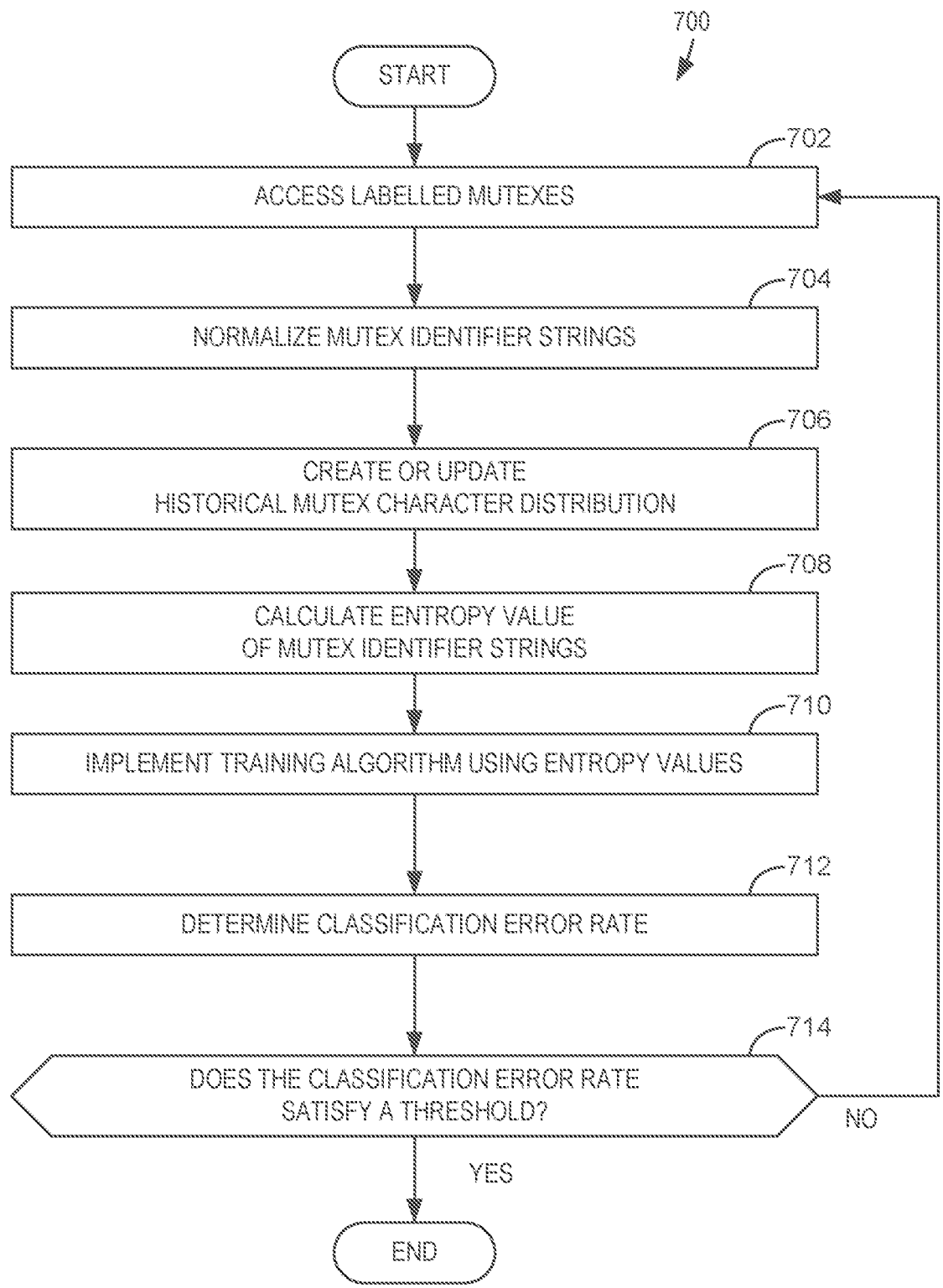
FIG. 7 is a flowchart representative of example machine readable instructions and/or example operations that may be executed by the model trainer circuitry of FIG. 1 to train an entropy model.

A flowchart representative of example hardware logic circuitry, machine readable instructions, hardware implemented state machines, and/or any combination thereof for implementing the example model trainer circuitry 102 of FIG. 2 is shown in FIG. 7. The machine readable instructions may be one or more executable programs or portion(s) of an executable program for execution by processor circuitry, such as the processor circuitry 412 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example model trainer circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that describe/herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and % or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7, 8, and 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone. (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to train an example entropy model 106. The machine readable instructions and/or the operations 700 of FIG. 7 begins when the example interface circuitry 2102 access labeled mutexes. (Block 702). The labeled mutexes come from training data 104 provided by the example computer security software company. The example interface circuitry 202 may access any number of labeled mutexes.

The example normalizer circuitry 206 normalizes mutex identifier strings associated with the labeled mutexes. (Block 704). To normalize a mutex identifier string, the example normalizer circuitry 206 may map multiple instances of a character and diacritic combination to a single character representation as described previously. The example normalizer circuitry 206 may additionally or alternatively remove non-differentiable characters as described previously.

The example character distribution circuitry 208 creates or updates the historical mutex character distribution 210 using the normalized mutex identifier strings. (Block 706). The character distribution 210 may incorporate characters from any natural language, including but not limited to English, Spanish, French, etc. If the historical mutex character distribution 210 has not yet been formed, the example character distribution circuitry 208 creates the distribution by calculating a character probability for each character and stores the normalized mutex identifier strings in the example mutex database 108 as the start of the historical data set. If the historical mutex character distribution 210 is already formed, the example character distribution circuitry 208 updates the distribution by adding the normalized mutex identifier strings to the historical data set in the example mutex database 108 and recalculating the character probabilities of all characters in the normalized mutex identifier strings based on the updated historical data set.

The example entropy calculator circuitry 212 calculates the entropy values of the normalized mutex identifier strings. (Block 708). The example entropy value is determined by the entropy equation as described in FIG. 2.

The example model former circuitry 214 implements a training algorithm using the entropy values as an input (Block 710). The example model former circuitry 214 may additionally use some or all of the mutex metadata included in the training data 104 as inputs to the training algorithm. The training algorithm may be implemented as a deep learning architecture or with a rules based heuristic architecture. The output of the training algorithm is an example entropy model 106. In some examples, the example model former circuitry 214 may re-train an existing version of an example entropy model 106 rather than forming a new one. The example model former circuitry 214 may determine whether to re-train or form a new model based on input from the example model verifier circuitry 216.

The example model verifier circuitry 216 determines the classification error rate of the example entropy model 106. (Block 712). In some examples, the example model verifier circuitry 216 may use additional training data provided by the example computer security software company to determine the classification error rate. In other examples, the example entropy model 106 is deployed for live usage and the example model verifier circuitry 216 analyzes feedback from the example model executor circuitry 120 to determine the classification error rate.

The example model verifier circuitry 216 determines whether the classification error rate satisfies a threshold. (Block 714). To satisfy the threshold of block 714, the example classification error rate may be less than or equal to a threshold value. A number used as the threshold value may be determined by the example computer security software company.

If the classification error rate satisfies a threshold, the machine readable instructions and/or the operations 700 ends. If the classification error rate does not satisfy a threshold, the machine readable instructions and/or the operations 700 continue to block 702, where the example interface circuitry 202 accesses additional labelled mutexes to re train the existing example entropy model 106 or to train a new version of an example entropy model 106. The additional labelled mutexes may come from additional training data 104 provided by the example computer security company or may be included in feedback provided by the example model executor circuitry 120.

Figure 8:
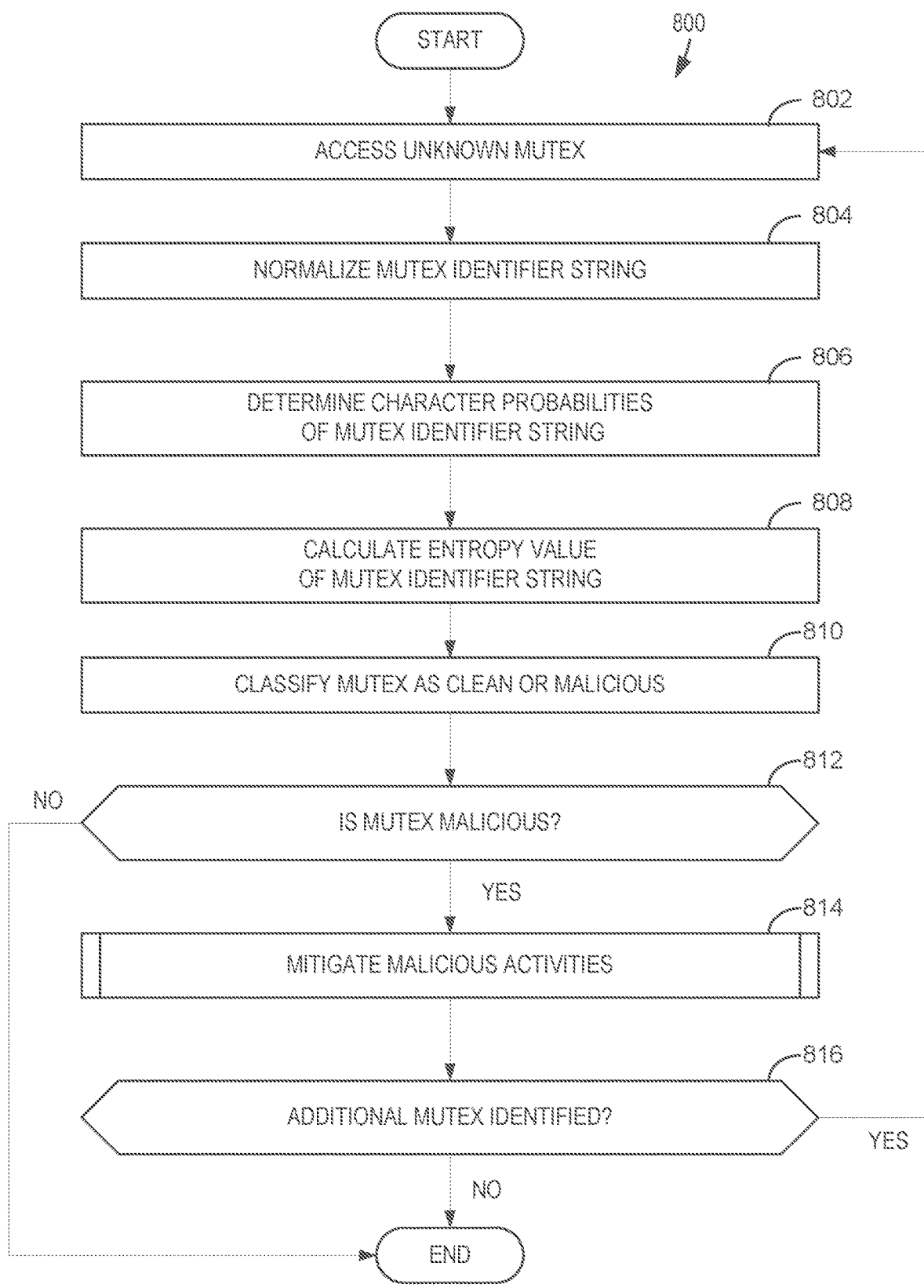
FIG. 8 is a flowchart representative of example machine readable instructions and/or example operations that may be executed by the model executor circuitry of FIG. 1 to execute an entropy model.

FIG. 8 is a flowchart representative of example machine readable instructions and/or example operations that may be executed by the model executor circuitry of FIG. 1 to execute an entropy model. The machine readable instructions and/or the operations 800 begin when the interface circuitry 302 accesses the mutex 118 associated with the software application 116. (Block 802). The mutex may be referred to as unknown in block 802 because it has yet to be classified as clean or malicious.

The example normalizer circuitry 304 normalizes the mutex identifier string associated with the mutex. (Block 804). To normalize the mutex identifier string, the example normalizer circuitry 304 may map multiple instances of a character and diacritic combination to a single character representation as described previously. The example normalizer circuitry 304 may additionally or alternatively remove non-differentiable characters as described previously.

The example character probability circuitry 306 determines character probabilities of the characters within the normalized mutex identifier string. (Block 806). The example character probability circuitry 306 finds the character probability of the unique character in the historical mutex character distribution 210. The example character probability circuitry 306 records the character probabilities of the characters found in the mutex string in a data structure, which allows for efficient searching of a character probability of the characters within the normalized mutex identifier string.

The example entropy calculator circuitry 308 calculates the entropy value of the normalized mutex identifier string. (Block 808). The example entropy value is determined by the entropy equation as described in FIG. 2. The example entropy calculator circuitry 308 determines character probabilities for the normalized mutex identifier string using the data structure of block 806.

The example classifier circuitry 310 classifies the mutex as clean or malicious. (Block 810). The example classifier circuitry 310 makes the classification by implementing the example entropy model 106, which accepts the entropy value of block 808 as an input.

The example protector circuitry 312 determines whether the mutex is classified as malicious. (Block 812). If the mutex is not classified as malicious, the machine readable instructions and/or the operations 800 end. If the mutex is classified as malicious, the example protector circuitry 312 mitigates malicious activities. (Block 814). In some examples, the example protector circuitry 312 identifies additional mutexes in block 814. Block 814 is explored further FIG. 9.

The example protector circuitry 312 determines whether an additional mutex has been identified. (Block 816). If an additional mutex has not been identified, the machine readable instructions and/or the operations 800 end. If an additional mutex has been identified, the machine readable instructions and/or the operations 800 continue at block 802, where the interface circuitry 302 accesses the additional mutex.

Figure 9:
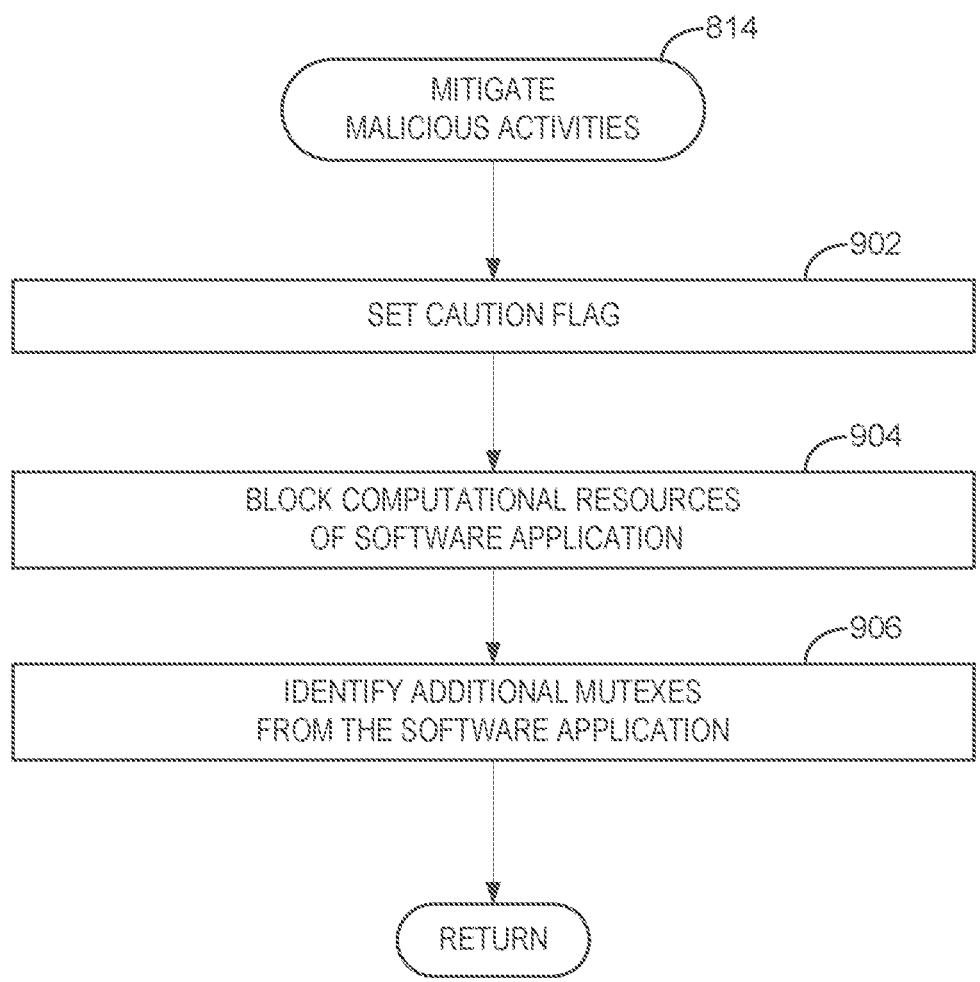
FIG. 9 is a flowchart representative of example machine readable instructions and/or example operations that may be executed by the protector circuitry of FIG. 3 to mitigate malicious activities as described in FIG. 8.

FIG. 9 is a flowchart representative of example machine readable instructions and/or example operations that may be executed by the protector circuitry of FIG. 3 to mitigate malicious activities as described in FIG. 8. The machine readable instructions and/or the operations of block 814 may be executed in any order. In some examples, all of the blocks described in the machine readable instructions and/or the operations of block 814 may be executed. In other examples, a subset of the blocks described in the machine readable instructions and/or the operations of block 814 may be executed. The example protector circuitry 312 may use a pre-determined rule set provided by the example computer security software company to determine the subset and the sequence of blocks.

The example protector circuitry 312 may set a caution flag if a mutex is classified as malicious. (Block 902). The caution flag may inform other computational resources within the example computer 112, other machines connected to the example network 110, a network administrator, and/or the user of the example computer 112 that a mutex has been classified as malicious. A recipient of a caution flat may take further action in response to receiving the caution flag. Additionally or alternatively, the caution flag may act as an input to a different machine learning model that takes further action in response to receiving the caution flag. The different machine learning model may include non-muter, related features to aide in the response to the caution flag.

The example protector circuitry 312 may block the computational resources of the software application associated with a mutex that is classified as malicious. (Block 904). Blocking computational resources includes but is not limited to preventing the software application from accessing the internet, preventing the software application from accessing memory resources, stopping the software application from performing additional tasks, etc. By blocking computational resources, the example protector circuitry 312 may stop a malware program from executing or mitigate the effects of a program already in execution.

The example protector circuitry 312 may identify additional mutexes from the software application. (Block 906). In some examples, the example model executor circuitry 120 may classify a subset of the mutexes generated by the operating system of the example computer 112. The sire of the subset may depend on the computational resources of the example computer 112. By identifying additional mutexes associated with the software application, the example protector circuitry 312 reduces the risk that the software application 116 triggers the generation of additional malicious mutexes, and that some or all of the additional malicious mutexes are not classified.

Figure 10:
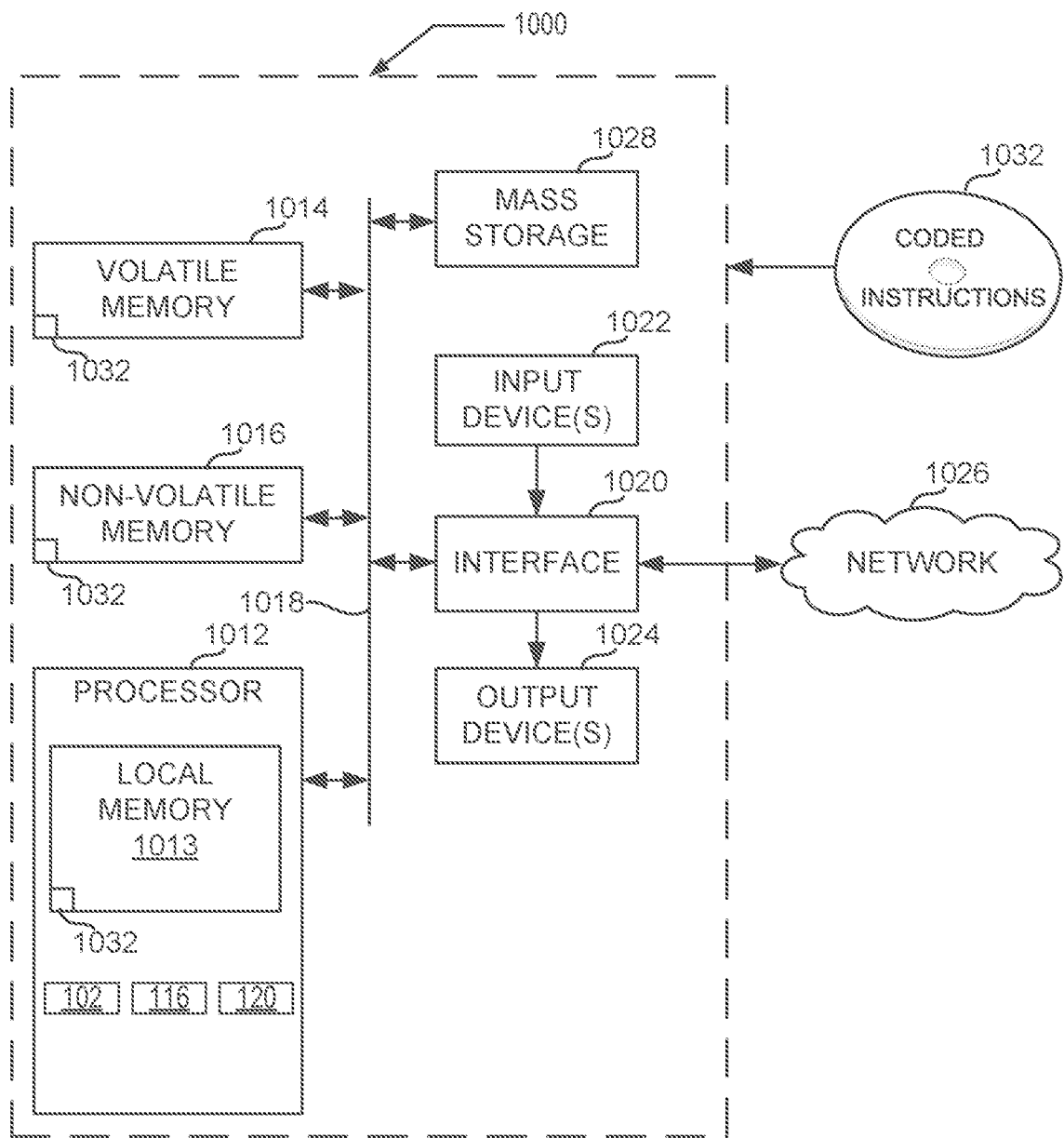
FIG. 10 is a block diagram of an example processing platform including processor circuitry structured to execute the example machine readable instructions and/or the example operations of FIGS. 7, 8, and 9 to implement the model trainer circuitry of FIG. 2 or model executor circuitry of FIG. 3.

FIG. 10 is a block diagram of an example processor platform 1000 structured to execute and/or instantiate the machine readable instructions and/or the operations of FIGS. 7, 8, 9, and 10 to implement the example model trainer circuitry 102 of FIG. 2 and the example model executor circuitry 120 of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits. FPGAs, microprocessors. CPUs, GPUs, DSPs, and/or micro controllers from any desired family or manufacturer. The processor circuitry 1012 may be implemented by one or more semiconductor based (e.g., silicon based) device's. In this example, the processor circuitry 1012 implements example interface circuitry 202, example mutex identifier circuitry 204, example normalizer circuitry 206, example character distribution circuitry 208, example entropy calculator circuitry 212, example model former circuitry 214, interface circuitry 302, example normalizer circuitry 304, example character probability circuitry 306, example entropy calculator circuitry 308, example classifier circuitry 310, and example protector circuitry 312. The processor circuitry 1012 of the illustrated example includes a local memory 1013 (e g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory anti/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RID) systems, solid state storage devices such as flash memory devices and/or SSDs, and DVD drives.

The machine executable instructions 1032, which may be implemented by the machine readable instructions of FIGS. 7, 8, and 9, may be stored in the mass storage device 1028, in the volatile memory 1014, in the non-volatile memory 1016, and/or on a removable non-transitory computer readable storage medium such as a CD or DVD.

Figure 11:
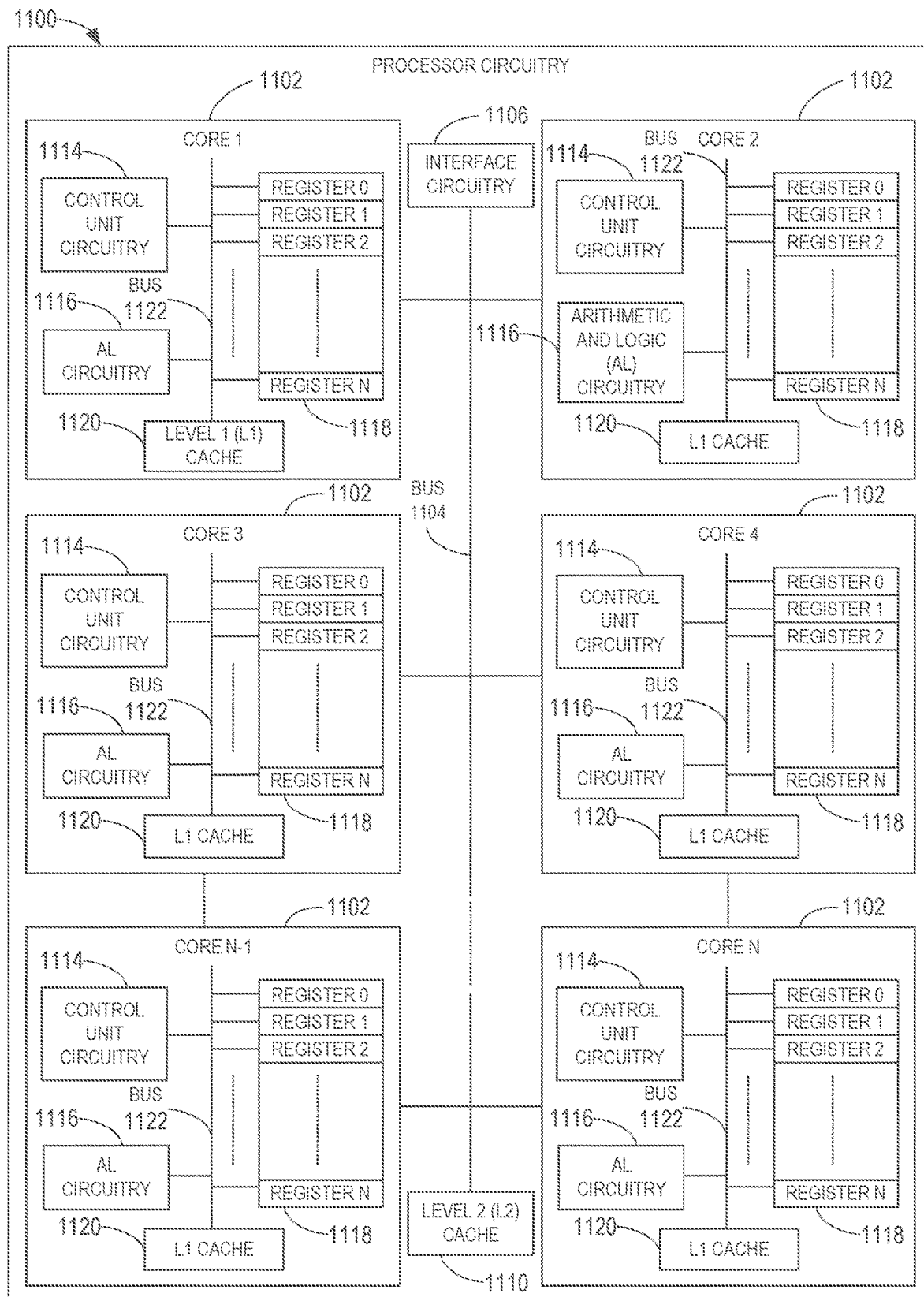
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a general purpose microprocessor 1100. The general purpose microprocessor circuitry 1100 executes some or all of the machine readable instructions of the flowchart of FIGS. 7, 8, and 9 to effectively instantiate the circuitry of FIG. 2 and FIG. 3 as logic circuits to perform the operations corresponding to those machine readable instructions. In some such examples, the circuitry of FIG. 2 example model trainer circuitry 102 and FIG. 3 model executor circuitry is instantiated by the hardware circuits of the microprocessor 1100 in combination with the instructions. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 7, 8, and 9.

The cores 1102 may communicate by a first example bus 1104. In some examples, the first bus 1104 may implement a communication bus to effectuate communication associated with one(s) of the cores 1102. For example, the first bus 1104 may implement at least one of an Inter-Integrated Circuit (I2C) bus, a Serial Peripheral Interface (SPI) bus, a PCI bus, or a PCIe bus. Additionally or alternatively, the first bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other example, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a hank as shown in FIG. 11. Alternatively, the registers 1118 may be organized in any other arrangement, format, or structure including distributed throughout the core 1102 to shorten access time. The second bus 1122 may implement at least one of an I2C bus, a SPI bus, a PCI bus, or a PCIe bus Each core 1102 and/or, more generally, the microprocessor 1100 may include additional and/or alternate structure to those shown and described above. For example, one or more clock circuits, one or more power supplies, one or more power gates, one or more cache home agents (CHAS), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
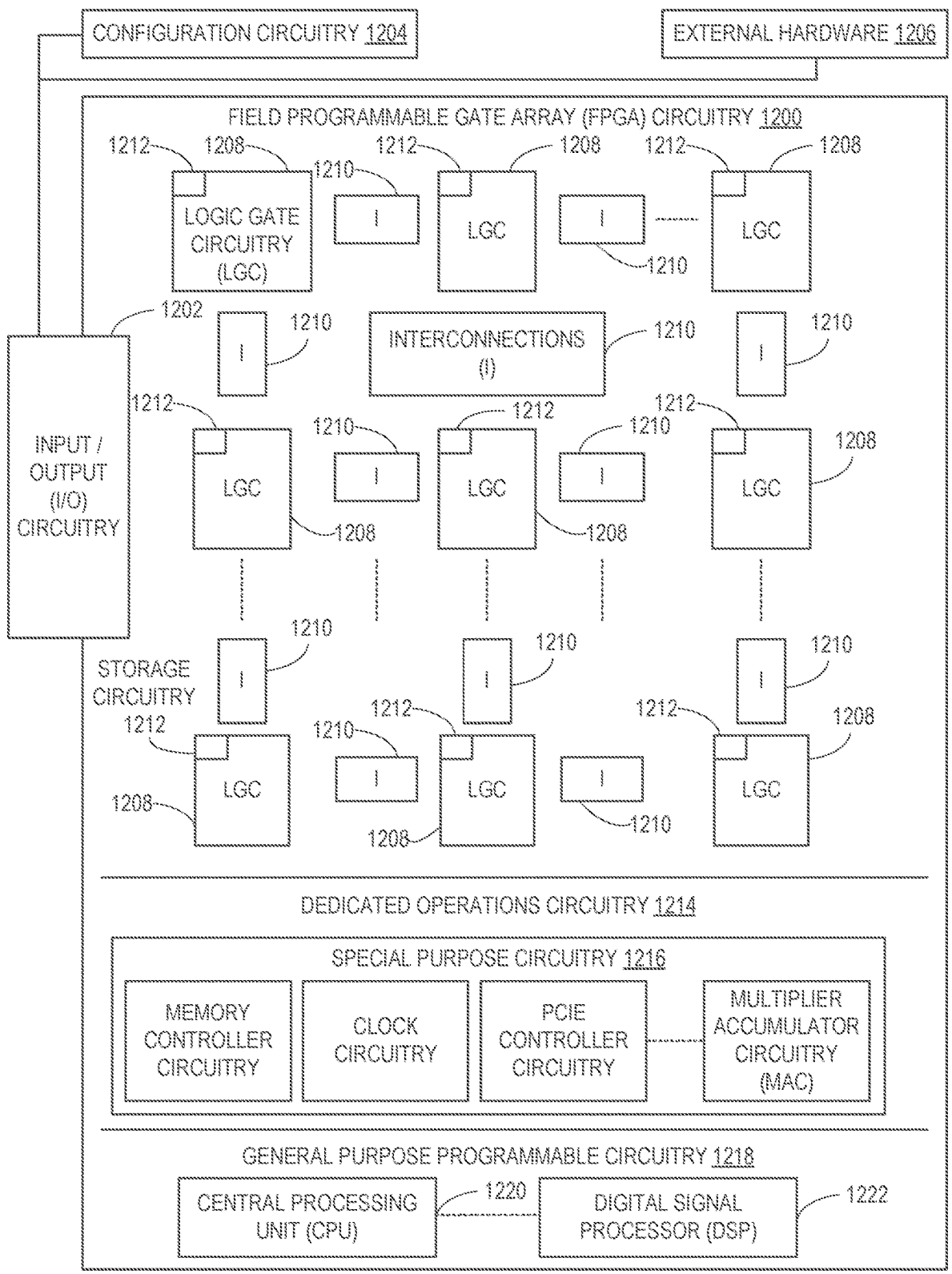
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 7, 8, and 9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 7, 8, and 9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 7, 8, and 9. As such, the FPGA circuitry 1200 may be structured to effectively instantiate some or all of the machine readable instructions of the flowcharts of FIGS. 7, 8, and 9 as dedicated logic circuits to perform the operations corresponding to those software instructions in a dedicated manner analogous to an ASIC. Therefore, the FPGA circuitry 1200 may perform the operations corresponding to the some or all of the machine readable instructions of flowcharts of FIGS. 7, 8, and 9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 7, 8, and 9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gate, Nor gates, etc.) that provide basic building blocks for logic circuits. Electrically controllable switches (e.g., transistors) are present within each of the logic mate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 12161 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modem FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowchart of FIGS. 7, 8, and 9 may be executed by one or more of the cores 1102 of FIG. 11, a second portion of the machine readable instructions represented by the flowcharts of FIGS. 7, 8, and 9 may be executed by the FPGA circuitry 1200 of FIG. 12, and/or a third portion of the machine readable instructions represented by the flowcharts of FIGS. 7, 8, and 9 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuit 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
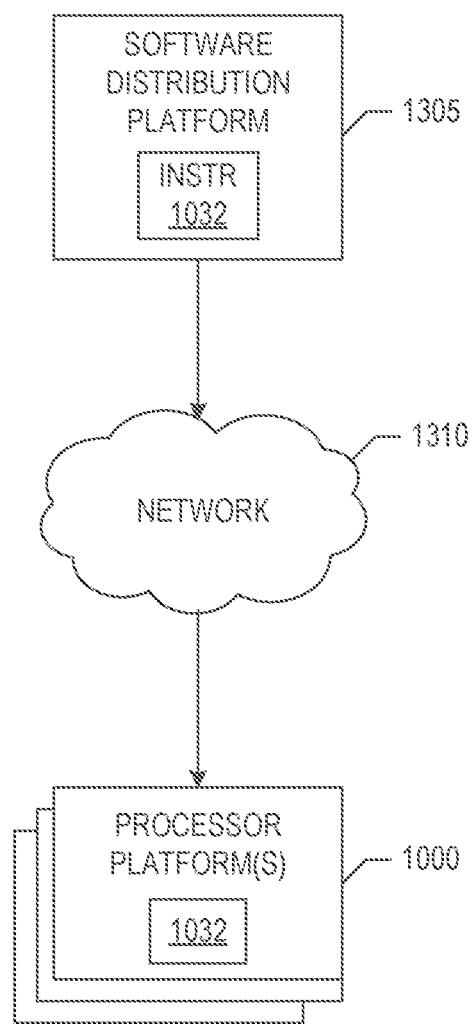
FIG. 13 is a block diagram of an example software distribution platform (e.g., one or more servers) to distribute software (e.g., software corresponding to the example machine readable instructions of FIGS. 7, 8, and 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 7, 8, and 9, as described above. The one or more servers of the example software distribution platform 1305 are in communication with a network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 1032 of FIG. 10, may be downloaded to the example processor platform 1000, which is to execute the machine readable instructions 1032 to implement the example model trainer circuitry 102 and/or example model executor circuitry 120. In some example, one or more servers of the software distribution platform 1305 periodically offer, transmit, and/or force updates to the software (e.g., the example machine readable instructions 1032 of FIG. 10) ensure improvements, patches, updates, etc., are distributed and applied to the software at the end user devices.

From the foregoing, it will be appreciated that example systems, methods, apparatus, and articles of manufacture have been disclosed that determine mutex entropy for malware classification. Disclosed systems, methods, apparatus, and articles of manufacture improve the efficiency of using a computing device by comparing a normalized mutex identifier string to a historical mutex character distribution to calculate an entropy value. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine mutex entropy for malware classification are disclosed herein. Further examples and combinations thereof include the following.

Example 1 includes an apparatus to determine mutex entropy for malware classification comprising interface circuitry to access a mutex associated with a software application, the mutex to include a mutex identifier string, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic mate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate normalizer circuitry to normalize the mutex identifier string, character probability circuitry to determine character probabilities of characters within the normalized mutex identifier string, the character probabilities based on a historical mutex character distribution, entropy calculator circuitry to calculate an entropy value for the mutex based on the character probabilities, classifier circuitry to classify the mutex as clean or malicious based on the entropy value, and protector circuitry to mitigate malicious activity based on the classification.

Example 2 includes the apparatus of example 1, wherein the historical mutex character distribution includes multiple character probabilities, a character probability from the multiple character probabilities to be associated with a character, the character probability to describe the probability that a randomly selected character from a historical data set of mutex identifier strings is the associated character.

Example 3 includes the apparatus of example 2, wherein the entropy calculator circuitry is to calculate a natural log of a character probability from the multiple character probabilities, the character probability associated with a character within the normalized mutex identifier string, a quotient determined by the natural log of the character probability divided by the natural log of two, and a product determined by the quotient multiplied with the character probability.

Example 4 includes the apparatus of example 3, wherein the product is a first product, further including multiple products associated with multiple characters within the normalized mutex identifier string, wherein the entropy calculator circuitry is to calculate the entropy value through a negative summation of the first product and the multiple products.

Example 5 includes the apparatus of example 1, wherein to classify the mutex, the classifier circuitry is to execute a model, the model trained using a deep learning architecture or a rules based heuristic algorithm, the model to accept the entropy value as an input.

Example 6 includes the apparatus of example 1, wherein the mutex identifier string is written in a natural language and a programming language, wherein the entropy calculator circuitry is to calculate the entropy value independently of the natural language and the programming language.

Example 7 includes the apparatus of example 1, wherein to normalize the mutex identifier string, the normalizer circuitry is to map multiple instances of a character and diacritic combination to a single character representation, and remove non-differentiable characters.

Example 8 includes the apparatus of example 1, wherein to mitigate malicious activity, the protector circuitry is to set a caution flag.

Example 9 includes the apparatus of example 1, wherein to mitigate malicious activity, the protector circuitry is to block computational resources of the software application.

Example 10 includes the apparatus of example 1, wherein to mitigate malicious activity, the protector circuitry is to identify additional mutexes associated with the software application.

Example 11 includes At least one non-transitory machine-readable medium comprising instructions that, when executed, cause at least one processor to at least access a mutex associated with a software application, the mutex to include a mutex identifier string, normalize the mutex identifier string, character probability circuitry to determine character probabilities of characters within the normalized mutex identifier string, the character probabilities based on a historical mutex character distribution 210, calculate an entropy value for the mutex based on the character probabilities, classify the mutex as clean or malicious based on the entropy value, and protector circuitry to mitigate malicious activity based on the classification.

Example 12 includes the at least one non-transitory machine-readable medium of example 11, wherein the historical mutex character distribution includes multiple character probabilities, a character probability from the multiple character probabilities to be associated with a character, the character probability to describe the probability that a randomly selected character from a historical data set of mutex identifier strings is the associated character.

Example 13 includes the at least one non-transitory machine-readable medium of example 12, wherein the instructions, when executed, cause the at least one processor to calculate a natural log of a character probability from the multiple character probabilities, the character probability associated with a character within the normalized mutex identifier string, a quotient determined by the natural log of the character probability divided by the natural log of two, and a product determined by the quotient multiplied with the character probability.

Example 14 includes the at least one non-transitory machine-readable medium of example 13, wherein the product is a first product, further including multiple products associated with multiple characters within the normalized mutex identifier string, wherein the instructions, when executed, cause the at least one processor to calculate the entropy value through a negative summation of the first product and the multiple products.

Example 15 includes the at least one non-transitory machine-readable medium of example 11, wherein to classify the mutex, the instructions, when executed, cause the at least one processor to execute a model, the model trained using a deep learning architecture or a rules based heuristic algorithm, the model to accept the entropy value as an input.

Example 16 includes the at least one non-transitory machine-readable medium of example 11, wherein the mutex identifier string is written in a natural language and a programming language, wherein the instructions, when executed, cause the at least one processor to calculate the entropy value independently of the natural language and the programming language.

Example 17 includes the at least one non-transitory machine-readable medium of example 11, wherein to normalize the string, the instructions, when executed, cause the at least one processor to map multiple instances of a character and diacritic combination to a single character representation, and remove non-differentiable characters.

Example 18 includes the at least one non-transitory machine-readable medium of example 11, wherein to mitigate malicious activity, the instructions, when executed, cause the at least one processor to set a caution flag.

Example 19 includes the at least one non-transitory machine-readable medium of example 11, wherein to mitigate malicious activity, the instructions, when executed, cause the at least one processor to block computational resources of the software application.

Example 20 includes the at least one non-transitory machine-readable medium of example 11, wherein to mitigate malicious activity, the instructions, when executed, cause the at least one processor to identify additional mutexes associated with the software application.

Example 21 includes a method to determine mutex entropy for malware classification, the method comprising accessing a mutex associated with a software application, the mutex to include a mutex identifier string, normalizing the mutex identifier string, determining character probabilities of characters within the normalized mutex identifier string, the character probabilities based on a historical mutex character distribution, calculating an entropy value for the mutex based on the character probabilities, classifying the mutex as clean or malicious based on the entropy value, and mitigating malicious activity based on the classification.

Example 22 includes the method of example 21, wherein the historical mutex character distribution includes multiple character probabilities, a character probability from the multiple character probabilities to be associated with a character, the character probability to describe the probability that a randomly selected character from a historical data set of mutex identifier strings is the associated character.

Example 23 includes the method of example 22, further including calculating a natural log of a character probability from the multiple character probabilities, the character probability associated with a character within the normalized mutex identifier string, a quotient determined by the natural log of the character probability divided by the natural log of two, and a product determined by the quotient multiplied with the character probability.

Example 24 includes the method of example 23, wherein the product is a first product, further including multiple products associated with multiple characters within the normalized mutex identifier string, further including calculating the entropy value through a negative summation of the first product and the multiple products.

Example 25 includes the method of example 21, wherein classifying the mutex further includes executing a model, the model trained using a deep learning architecture or a rules based heuristic algorithm, the model to accept the entropy value as an input.

Example 26 includes the method of example 21, wherein the mutex identifier string is written in a natural language and a programming language, further including calculating the entropy value independently of the natural language and the programming language.

Example 27 includes the method of example 21, wherein normalizing the mutex identifier string further includes mapping multiple instances of a character and diacritic combination to a single character representation, and removing non-differentiable characters.

Example 28 includes the method of example 21, wherein mitigating malicious activity further includes setting a caution flag.

Example 29 includes the method of example 21, wherein mitigating malicious activity further includes blocking computational resources of the software application.

Example 30 includes the method of example 21, wherein mitigating malicious activity further includes identifying additional mutexes associated with the software application.

Example 31 includes an apparatus to determine mutex entropy for malware classification, the apparatus comprising means for accessing a mutex associated with a software application, the mutex to include a mutex identifier string, means for normalizing the mutex identifier string, means for determining character probabilities of characters within the normalized mutex identifier string, the character probabilities based on a historical mutex character distribution, means for calculating an entropy value for the mutex based on the character probabilities, means for classifying the mutex as clean or malicious based on the entropy value, and means for mitigating malicious activity based on the classification.

Example 32 includes the apparatus of example 31, wherein the historical muter character distribution includes multiple character probabilities, a character probability from the multiple character probabilities to be associated with a character, the character probability to describe the probability that a randomly selected character from a historical data set of mutex identifier strings is the associated character.

Example 33 includes the apparatus of example 32, wherein the means for calculating an entropy value further includes means for calculating a natural log of a character probability from the multiple character probabilities, the character probability associated with a character within the normalized mutex identifier string, a quotient determined by the natural log of the character probability divided by the natural log of two, and a product determined by the quotient multiplied with the character probability.

Example 34 includes the apparatus of example 33, wherein the product is a first product, further including multiple products associated with multiple characters within the normalized mutex identifier string, wherein the means for calculating the entropy value further includes means for calculating a negative summation of the first product and the multiple products.

Example 35 includes the apparatus of example 31, wherein the means for classifying the mutex further includes means for executing a model, the model trained using a deep learning architecture or a rules based heuristic algorithm, the model to accept the entropy value as an input.

Example 36 includes the apparatus of example 31, wherein the mutex identifier string is written in a natural language and a programming language, further including calculating the entropy value independently of the natural language and the programming language.

Example 37 includes the apparatus of example 31, wherein the means for normalizing the mutex identifier string further includes means for mapping multiple instances of a character and diacritic combination to a single character representation, and means for removing non-differentiable characters.

Example 38 includes the apparatus of example 31, wherein the means for mitigating malicious activity further includes means for setting a caution flag.

Example 39 includes the apparatus of example 31, wherein the means for mitigating malicious activity further includes means for blocking computational resources of the software application.

Example 40 includes the apparatus of example 31, wherein the means for mitigating malicious activity further includes means for identifying additional mutexes associated with the software application.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An electrical system to determine mutex entropy for malware classification comprising:
   interface circuitry to access a mutex associated with a software application, the mutex to include a mutex identifier string;
   machine readable instructions; and
   programmable circuitry to at least one of instantiate or execute the machine readable instructions to:
   normalize the mutex identifier string;
   determine character probabilities of characters within the normalized mutex identifier string, the character probabilities based on a historical mutex character distribution;
   determine an entropy value for the mutex based on the character probabilities by calculating:
     a natural log of a character probability from the character probabilities, the character probability associated with a character within the normalized mutex identifier string;
     a quotient determined by the natural log of the character probability divided by the natural log of two; and
     a product determined by the quotient multiplied with the character probability;
   classify the mutex as clean or malicious based on the entropy value; and
   mitigate malicious activity based on the classification.

2. The electrical system of claim 1, wherein the historical mutex character distribution includes multiple character probabilities, a character probability from the multiple character probabilities to be associated with a character, the character probability to describe the probability that a randomly selected character from a historical data set of mutex identifier strings is the associated character.

3. The electrical system of claim 1, wherein the product is a first product, further including multiple products associated with multiple characters within the normalized mutex identifier string, wherein the programmable circuitry is to calculate the entropy value through a negative summation of the first product and the multiple products.

4. The electrical system of claim 1, wherein to classify the mutex, the programmable circuitry is to execute a model, the model trained using a deep learning architecture or a rules based heuristic algorithm, the model to accept the entropy value as an input.

5. The electrical system of claim 1, wherein the mutex identifier string is written in a natural language and a programming language, wherein the programmable circuitry is to calculate the entropy value independently of the natural language and the programming language.

6. The electrical system of claim 1, wherein to normalize the mutex identifier string, the programmable circuitry is to:
    map multiple instances of a character and diacritic combination to a single character representation; and
    remove non-differentiable characters.

7. The electrical system of claim 1, wherein to mitigate malicious activity, the programmable circuitry is to set a caution flag.

8. The electrical system of claim 1, wherein to mitigate malicious activity, the programmable circuitry is to block computational resources of the software application.

9. The apparatus electrical system of claim 1, wherein to mitigate malicious activity, the programmable circuitry is to identify additional mutexes associated with the software application.

10. At least one non-transitory machine-readable medium comprising instructions that, when executed, cause at least one processor to at least:
    access a mutex associated with a software application, the mutex to include a mutex identifier string;
    normalize the mutex identifier string;
    determine character probabilities of characters within the normalized mutex identifier string, the character probabilities based on a historical mutex character distribution;
    determine an entropy value for the mutex based on the character probabilities by calculating:
        a natural log of a character probability from the character probabilities, the character probability associated with a character within the normalized mutex identifier string;
        a quotient determined by the natural log of the character probability divided by the natural log of two; and
        a product determined by the quotient multiplied with the character probability;
    classify the mutex as clean or malicious based on the entropy value; and
    mitigate malicious activity based on the classification.

11. The at least one non-transitory machine-readable medium of claim 10, wherein the historical mutex character distribution includes multiple character probabilities, a character probability from the multiple character probabilities to be associated with a character, the character probability to describe the probability that a randomly selected character from a historical data set of mutex identifier strings is the associated character.

12. The at least one non-transitory machine-readable medium of claim 10, wherein the product is a first product, further including multiple products associated with multiple characters within the normalized mutex identifier string, wherein the instructions, when executed, cause the at least one processor to calculate the entropy value through a negative summation of the first product and the multiple products.

13. The at least one non-transitory machine-readable medium of claim 10, wherein to classify the mutex, the instructions, when executed, cause the at least one processor to execute a model, the model trained using a deep learning architecture or a rules based heuristic algorithm, the model to accept the entropy value as an input.

14. The at least one non-transitory machine-readable medium of claim 10, wherein the mutex identifier string is written in a natural language and a programming language, wherein the instructions, when executed, cause the at least one processor to calculate the entropy value independently of the natural language and the programming language.

15. The at least one non-transitory machine-readable medium of claim 10, wherein to normalize the string, the instructions, when executed, cause the at least one processor to:
    map multiple instances of a character and diacritic combination to a single character representation; and
    remove non-differentiable characters.

16. The at least one non-transitory machine-readable medium of claim 10, wherein to mitigate malicious activity, the instructions, when executed, cause the at least one processor to set a caution flag.

17. The at least one non-transitory machine-readable medium of claim 10, wherein to mitigate malicious activity, the instructions, when executed, cause the at least one processor to block computational resources of the software application.

18. The at least one non-transitory machine-readable medium of claim 10, wherein to mitigate malicious activity, the instructions, when executed, cause the at least one processor to identify additional mutexes associated with the software application.

19. A method to determine mutex entropy for malware classification, the method comprising:
    accessing a mutex associated with a software application, the mutex to include a mutex identifier string;
    normalizing the mutex identifier string;
    determining character probabilities of characters within the normalized mutex identifier string, the character probabilities based on a historical mutex character distribution;
    determining an entropy value for the mutex based on the character probabilities by calculating:
        a natural log of a character probability from the character probabilities, the character probability associated with a character within the normalized mutex identifier string;
        a quotient determined by the natural log of the character probability divided by the natural log of two; and
        a product determined by the quotient multiplied with the character probability;
    classifying the mutex as clean or malicious based on the entropy value; and
    mitigating malicious activity based on the classification.

20. The method of claim 19, wherein the historical mutex character distribution includes multiple character probabilities, a character probability from the multiple character probabilities to be associated with a character, the character probability to describe the probability that a randomly selected character from a historical data set of mutex identifier strings is the associated character.

21. The method of claim 19, wherein the product is a first product, further including multiple products associated with multiple characters within the normalized mutex identifier string, further including calculating the entropy value through a negative summation of the first product and the multiple products.

22. The method of claim 19, wherein classifying the mutex further includes executing a model, the model trained using a deep learning architecture or a rules based heuristic algorithm, the model to accept the entropy value as an input.

23. The method of claim 19, wherein the mutex identifier string is written in a natural language and a programming language, further including calculating the entropy value independently of the natural language and the programming language.

24. The method of claim 19, wherein normalizing the mutex identifier string further includes:

mapping multiple instances of a character and diacritic combination to a single character representation; and removing non-differentiable characters.

25. The method of claim 19, wherein mitigating malicious activity further includes setting a caution flag.

26. The method of claim 19, wherein mitigating malicious activity further includes blocking computational resources of the software application.

27. The method of claim 19, wherein mitigating malicious activity further includes identifying additional mutexes associated with the software application.

* * * * *